May 31, 1960
G. H. FELIX
2,938,642
TONGUE FOR TRAILERS
Filed June 25, 1958
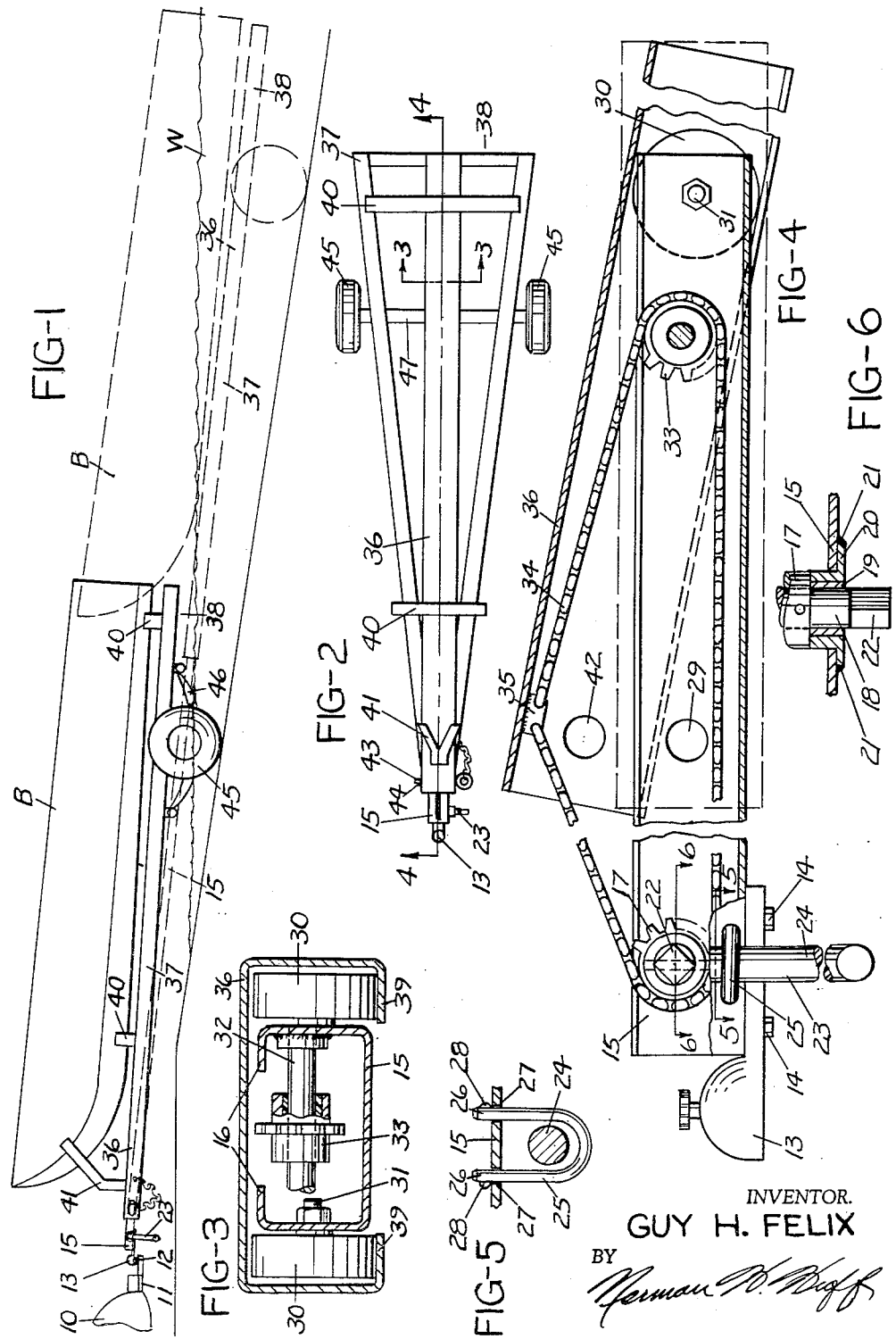
INVENTOR.
GUY H. FELIX
BY 2,938,642

TONGUE FOR TRAILERS

Guy Hugh Felix, W. 5230 Hoffman Place,
Spokane, Wash.

Filed June 25, 1958, Ser. No. 744,616

5 Claims. (Cl. 214—505)

This invention is an improved articulate tongue for trailers.

My present invention while disclosing and reciting in the preambles of the claims a tongue for a boat trailer, is not so limited, but is admirably adapted for use on other types of trailers, and I therefore do not wish to be restricted by the use of the term "boat trailer" or similar phrase, even though it is employed throughout the specification and in the preambles of the claims, but I desire to cover the invention broadly for every use of which it is found to be susceptible and, therefore, it is one object of the present invention to provide an improved articulate tongue for trailers which greatly simplifies the problems attendant to loading and unloading.

Another object of the invention lies in the provision of an articulate tongue for trailers which is particularly useful with respect to a boat trailer which must be extended a considerable distance from its towing vehicle or tractor to load and unload and often over uneven terrain.

Another object of the invention lies in the provision of a boat trailer having an articulate tongue which enables one to load and/or unload a boat therefrom without entering the water upon which the boat floats.

Still another object of the present invention lies in the provision of a boat trailer which is assembled with facility from a minimum number of parts, one which is well constructed and admirably adapted for its intended use, and one which will not be liable to become inoperative.

These and other important objects of the present invention will become more apparent during a study of the following specification when considered in conjunction with the accompanying drawings, wherein like reference numerals are employed to designate like parts. It should be understood that the drawings are exemplifying only and are not intended to limit the invention.

In the drawings:

Figure 1 is a diagrammatic side elevation showing my improved trailer tongue hitched to a towing vehicle, and in its transporting position by the full line representation and a loading and unloading position by the broken line representation;

Figure 2 is a diagrammatic plan view of a trailer including my improved tongue;

Figure 3 is an enlarged fragmentary lateral cross section taken substantially on the plane indicated by line 3—3 of Figure 2;

Figure 4 is an enlarged longitudinal vertical cross section having portions broken away for convenience of illustration and taken on the plane indicated by line 4—4 of Figure 2;

Figure 5 is a fragmentary detail view of the crank lock taken substantially on the horizontal plane indicated by line 5—5 of Figure 4; and Figure 6 is a fragmentary horizontal cross section taken substantially on the plane indicated by line 6—6 of Figure 4.

Referring now more particularly to the drawings, the numeral 10 indicates in its entirety a towing vehicle which has a hitch 11 including the ball portion 12 of a ball and socket trailer connection at the rear end of the tractor or towing vehicle 10. A conventional socket portion 13 of the ball and socket connection is mounted as by bolts 14 to the forward end of a drawbar 15 which, it will be seen in Figure 3, is U-shaped in cross section and includes inwardly extending strengthening flanges 16 defining the upwardly disposed open side of the drawbar 15.

At its forward end the drawbar 15 is provided with a sprocket 17 which is rigidly fixed by a pin or otherwise to a shaft 18 journaled at opposite sides in bushings 19 carried by flanged collars 20 which are welded or otherwise secured as at 21 to the drawbar 15. It will thus be seen that the sprocket 17 is journaled for rotation on a vertical plane extending longitudinally of the drawbar 15.

At its outer end, the shaft 18 is squared as at 22 to receive the hand crank 23 by means of which the sprocket 17 may be selectively rotated. When inoperative, the throw or arm 24 of the hand crank 23 may be straddled by a yoke 25 which has its projecting legs 26 extending through apertures 27 formed in a wall of the drawbar 15 and the yoke 25 is removably held therein by means of detents 28. Therefore it will be seen that the crank 23 may be secured in position so that the sprocket 17 will not accidentally turn.

Slightly spaced from the forward end of the drawbar 15, I form a locking aperture 29, the purpose of which will be subsequently seen.

At its rearward end, the drawbar 15 is provided with laterally disposed rollers 30 which are journaled on shafts or bolts 31 secured rigidly to the drawbar 15. Spaced forwardly only a slight distance from the bolts 31 of the rollers 30, I provide a laterally extending idler shaft 32 upon which is journaled an idler sprocket 33.

Trained about the longitudinally spaced sprockets 17 and 33 is an endless chain 34 which has one link or portion thereof welded or otherwise rigidly secured at 35 to the forward end portion of a guide member 36 forming a fixed part of the frame 37 of the boat trailer 38. As seen in Figure 3, the guide member 36 is of inverted U-shape and has inwardly disposed flanges 39 which define its downwardly disposed open side. The rollers 30 are disposed to roll upon the inner faces of the flanges 39 and therefore the drawbar 15 has its rearward end confined for longitudinal movements relative to and substantially along the full length of the guide member 36.

It will also be noted that because of the physical dimensions and relationship of the drawbar 15 to the guide member 36, the drawbar and guide member are associated for angular displacement or tilting movement of the drawbar downwardly about the axis of the bolts 31 from the guide member 36. This tilting movement, however, is limited to a predetermined angular displacement by reason of the chain 34 being rigidly fixed at 35 to the guide member 36.

It will be noted that the trailer 38 is provided with the conventional saddles 40 carried by the frame 37 and a bow guide 41 for a trailer used to carry a boat. It will be understood, however, that other load-carrying members may be supplied if the trailer is to be employed for other purposes.

Means (not shown) are used to secure the boat to the frame 37 of the trailer 38 as is conventional in trailers of this type.

The guide member 36 is provided with a bore 42 which when the drawbar 15 is retracted to its rearward extremity, is in axial alignment with the aperture 29 to receive a locking pin 43 having a detent at 44 to secure the members together against angular and rectilinear displacement while the trailer is being transported. It will be noted that the trailer 38 is mobilized by means of wheels 45 which may be supported on the conventional springs as at 46, secured to the axle 47.

In operation, after the vehicle 10 is backed to the water's edge, the pin 43 is removed and then by rotating the crank 23 in the proper direction the trailer is shifted further into the water W until the boat B floats free. The tongue may angle over a high bank as shown in Figure 4 if need be by reason of its articulate connection.

When loading, the boat B is floated over the trailer and secured thereto in one of many well known ways, and then the crank 23 is rotated to retract the drawbar 15 and thus pull the trailer partially out of the water. When the bores 42 and 29 are aligned, the pin 43 is inserted and the vehicle may then be used to tow the trailer away.

While the tongue has been described in its application to a boat trailer, it will be understood that the tongue may equally well be applied to other vehicular objects and to other analogous purposes.

What I therefore wish to claim is as follows:

1. In a boat trailer having a mobilized frame, a tongue comprising an inverted U-shape guide member forming a fixed part of said frame; said guide member having inwardly projecting flanges defining its downwardly presented open side; a U-shaped drawbar having means at its forward end adapted to be connected to a towing vehicle and of a size adapted to pass between the flanges of said guide member; rollers journaled on said drawbar and supported upon said guide member flanges for confining the rearward end of said drawbar for longitudinal movement relative to and along substantially the full length of said guide member; longitudinally spaced sprockets journaled on said drawbar for rotation in a vertical plane; a chain trained about said sprockets and having a portion thereof fixed rigidly to the forward end of said guide member; a hand crank adapted to drive one said sprocket whereby manual crank operation will drive said chain and effect longitudinal movements between said drawbar and said guide member; and said chain being of a length to effectively limit the angular displacement of said guide member and said drawbar relative to each other.

2. In a boat trailer having a mobilized frame; a tongue comprising an inverted U-shape guide member forming a fixed part of said frame; a drawbar having means at its forward end adapted to be connected to a towing vehicle; means confining the rearward end of said drawbar for longitudinal movements relative to and along substantially the full length of said guide member; said means supporting said drawbar for angular displacement with respect to said guide member about a lateral axis defined by said last named means; longitudinally spaced sprockets journaled on said drawbar for rotation in a vertical plane; a chain trained about said sprockets and having a portion thereof rigidly fixed with respect to said guide member at its forward end; and means for powering one said sprocket, whereby for selectively effecting longitudinal movements of said drawbar with respect to said guide member and said chain effectively limiting angular displacement of said guide member and said drawbar relative to each other.

3. In a boat trailer having a mobilized frame, a tongue comprising a guide member forming a fixed part of said frame and extending longitudinally thereof; a drawbar having means at its forward end adapted to be connected to a towing vehicle, means at the rearward end of said drawbar operably associated with said guide member for supporting the rearward end of said drawbar for longitudinal movements thereon; said drawbar having means limiting the angular displacement thereof with respect to said guide member to a vertical plane; means limiting the maximum degree of angularity between said drawbar and said guide member; and manually actuated power means located adjacent to its forward end on said drawbar for effecting longitudinal movements of the rearward end of said drawbar with respect to said guide member.

4. In a boat trailer having a mobilized frame, a tongue comprising a guide member forming a fixed part of said frame; a drawbar having means at its forward end adapted to be connected to a towing vehicle; means confining the rearward end of said drawbar for longitudinal movements relative to and along substantially the full length of said guide member; means for selectively effecting said movements; and means for limiting angular displacement of said guide member and said drawbar relative to each other to a vertical plane and within a predetermined degree of angularity.

5. In a boat trailer having a mobilized frame, an articulate tongue comprising a drawbar having means at its forward end adapted to be connected to a towing vehicle; means at its rearward end uniting said drawbar to said frame for relative longitudinal telescopic and vertical tilting movements; and manually operated control means for selectively limiting said telescopic and tilting movements.

References Cited in the file of this patent

UNITED STATES PATENTS 2,763,384     Foster _____ Sept. 18, 1956